United States Patent [19]

Ernst, Jr. et al.

[11] 3,971,473
[45] July 27, 1976

[54] TRI-LEVEL SELECTOR

[76] Inventors: Franklin Henry Ernst, Jr., 631 Tennessee St., Vallejo, Calif. 94590; Martin N. Nelson, 20326 Cohasset St., Canoga Park, Calif. 91304

[22] Filed: June 17, 1974

[21] Appl. No.: 480,228

[52] U.S. Cl. .................... 209/73; 209/111.7 T; 250/569; 235/61.7 R
[51] Int. Cl.² ........................ B07C 3/10; G06K 9/00
[58] Field of Search ............ 209/80.5, 73, 74, 110, 209/110.5, 111.5, 111.7; 250/569, 555; 235/61.7 R; 35/48 R, 48 B

[56] References Cited
UNITED STATES PATENTS

| | | | |
|---|---|---|---|
| 2,898,801 | 8/1959 | Rockafellow | 209/111.7 X |
| 3,267,258 | 8/1966 | Beue | 235/61.7 R |

*Primary Examiner*—Stanley H. Tollberg
*Assistant Examiner*—Joseph J. Rolla
*Attorney, Agent, or Firm*—Schapp and Hatch

[57] ABSTRACT

A selecting machine of the type commonly used for addressing mailed material from individual data-bearing cards, using tri-level logical comparator circuitry to compare the individual cards against an interchangeable master card. Both the individual and the master cards are perforated in files of holes longitudinal to the direction in which they are synchronously moved by the machine, the files of perforations being sensed by phototransistors connected in turn to the logic circuitry. For each potentially perforable site on the individual card, there are two corresponding locations on the master card, one of which when matched by a perforation on the individual card indicates nominal selection of the individual card, the other of which indicates positive rejection of the individual card, overriding any nominal selection, with rejection by default occurring if neither location on the master is perforated to correspond with a perforation at the equivalent site on the individual card. Synchronization pulses for gating the logic circuitry in the examination process are derived from a completely perforate file on the master card.

24 Claims, 4 Drawing Figures

TRI-LEVEL SELECTOR

This application is related to application Ser. No. 364,010, filed May 25, 1973, now U.S. Pat. No. 3,817,171, the disclosure of which is hereby incorporated herein by reference.

BACKGROUND OF THE INVENTION

This invention relates to a TRI-LEVEL SELECTOR and more particularly to a device for selecting desired individual information-bearing media from a group of such media scanned by the device.

Devices of the present type are often used for such purposes as addressing mailed material, as more fully disclosed in the above-cited co-pending application. A typical machine of this type operates on a stack of embossed or ink-transferring individual cards, selecting certain ones of the cards to be imprinted against a receiving medium, typically an envelope, in accordance with selection criteria programmed into the machine by various means, including cams and linkages such as found in calculating machines, or electric plugboards.

The problems with many prior art devices in this field are discussed in greater detail in the above-cited application, but the present application is directed to the problems encountered by the use of only a single exclusionary mode in the operation of prior machines. For example, in the prior art machines, a complete reprogramming of the selection criteria would be required in order to positively exclude a single narrow class of cards from selection. This need might arise from the use of the cards to address a mailing, where it was desired to exclude from the mailing those persons receiving a previous, small mailing, as well as those excluded by other characteristics from both mailings.

SUMMARY OF THE INVENTION

The apparatus of the present invention simultaneously scans a perforated master card and a perforated individual data card, photoelectrically sensing the patterns of perforations and comparing the patterns in a tri-level logic circuit. The logic circuit is capable of exercising two distinct modes of exclusion, as well as a single inclusion mode.

The provision of two exclusionary modes, one operating by default and one by specific indication, allows much greater flexibility in the programming and use of the machine. For example, certain members of a mailing list may receive an advance mailing of particular marerial, with certain other members to receive another mailing, from which the first group are excluded, with the balance of the list excluded from both mailings. In this example, the first group can be programmed through tri-level logic to be included in the first mailing and specifically excluded from the second, with a third group falling into the default exclusion mode from both mailings.

A further programming simplification results when the master card is made longitudinally symmetric in the position of its data fields indicating inclusion and positive exclusion. With such symmetry, nominal inclusion, or "acceptance," can be changed to positive exclusion by a simple inversion of the master card. In the example given above. the operator would merely have to turn over the master card to change the machine from the first mailing to the second mailing.

Accordingly, it is a principal object of the present invention to provide a selector device of the character described which simplifies the programming of a specifically excluded class of cards while retaining a generally excluded class.

A further principal object of the present invention is to provide a device of the character described which performs a highly sophisticated discrimination among the individual cards with a minimum of both mechanical complexity and electronic memory capacity.

Yet another object of the present invention is to provide a device of the character described having a rapid changeover from specific exclusion to nominal inclusion and vice versa.

A still further object of the present invention is to provide a device of the character described having ready interchangeability of the master means which specifies the selection criteria.

Another object of the present invention is to provide a device of the character described which synchronously scans the master and individual media for comparison.

Further objects and advantages of the invention will become apparent as the specification progresses, and the new and useful features of the tri-level selector will be more fully defined in the claims attached hereto.

BRIEF DESCRIPTION OF THE DRAWINGS

The preferred forms of the present invention are illustrated in the accompanying drawings forming part of this specification, in which.

Figure 1:
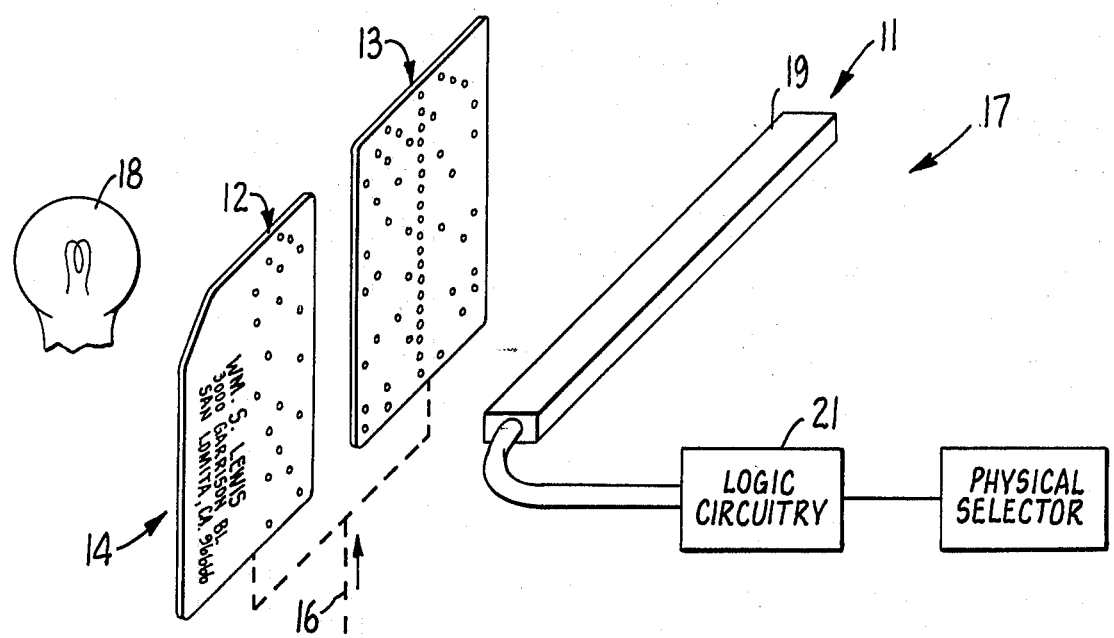
FIG. 1 is a schematic diagram of the tri-level selector of the present invention.

While only the preferred forms of the present invention have been shown here, it should be appreciated that various changes or modifications may be made within the scope of the claims attached hereto without departing from the spirit of the invention.

DESCRIPTION OF THE PREFERRED EMBODIMENTS

Referring to the drawings in detail, it will be seen that the selection device 11 of the present invention selects among a plurality of individual information-bearing media 12 which are moved in synchronism with a master indicia-bearing medium 13 through a scanning station generally indicated at 14 by a transport means schematically indicated at 16. The transport means may be any appropriate to provide the jointly synchronous, substantially continuous motion of the two media 12 and 13 for the simultaneous scanning and any other desired operations. Two examples of suitable transport means, a rotating drum and a conveyor belt, are shown in the above-cited co-pending application and incorporated herein by reference.

Figure 2:
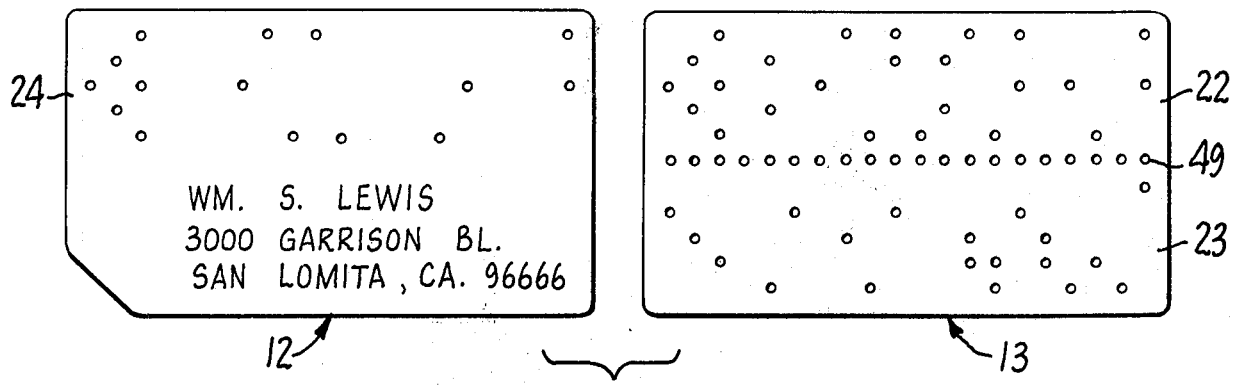
FIG. 2 is a plan view on an enlarged scale of the individual and master media of the present invention.

The individual medium 12 and the master medium 13 each bear a pattern of perforate and imperforate areas, shown in more detail in FIG. 2. The perforations of the individual medium 12 bear data relevant to the information imprintable from that medium, and those of the master medium 13 specify the characteristics of the individual media 12 to be selected or rejected for further operation by the machine, such as imprinting. The perforations and the imperforate areas are located in a rectangular grid of potentially perforable points on the media 12 and 13, with a pair of points on the master medium 13 corresponding to each point on the individual medium 12.

The points on the master medium 13 are organized into two fields, an "accept" field 22 and a "reject" field 23. The points in the "accept" field 22 correspond to nominally desired selection of the individual medium having a corresponding perforation in its "identity" field 24, and those in the "reject" field 23 correspond to positive rejection of an individual medium 12 having a matching perforation in its identity field 24. The rectangular grids on both media 12 and 13 are oriented with one axis parallel to the direction of longitudinal motion of the media past the scanning means 17, so that it may be said that the perforate and imperforate areas in each field form files parallel to the direction of motion of the media.

The scanning of the media 12 and 13 at the scanning station 14 is done by a scanning means generally indicated at 17, adjacent the scanning station 14. The scanning means 17 is responsive to the characteristics of the individual medium 12 as compared simultaneously with the master medium 13 to detect the individual media 12 appropriate for selection and issue a "select" signal upon such detection. The scanning means 17 includes a light source 18, which may be one or more small incandescent lamps, a plurality of photosensitive devices, schematically indicated at 19 positioned to sense light from the light source 18 passing through the perforate areas of the media 12 and 13, and a logical comparator circuit, schematically indicated at 21 and shown in more detail in FIG. 3.

The logical comparator circuit 21 receives signals from the detection means, the photosensitive devices 19, and compares the signals from the individual medium 12 with those from the master medium 13 to determine whether the individual medium 12 is to be included in the selected class, positively excluded from that class, or excluded by default. The logical comparator circuit 21 may thus be seen to operate on three levels, or in three states. The first state is that calling for selection of the individual meduim 12, and is produced by correspondence of a perforation on the individual medium with one at the corresponding location in the "accept" field 22 on the master medium 13.

The second state is that calling for positive rejection of the individual meduim 12, and is produced by correspondence of a perforation on the individual medium with one at the corresponding location in the "reject" field 23 on the master medium. The third, or rejection by default, stage is produced by lack of correspondence of a perforation in either of the fields 22 or 23 on the master medium with a perforation at the equivalent location on the individual medium 12. These three levels or states converge to two states, "select" and "do not select" in the output stages of the comparator circuit 21.

Figure 3:
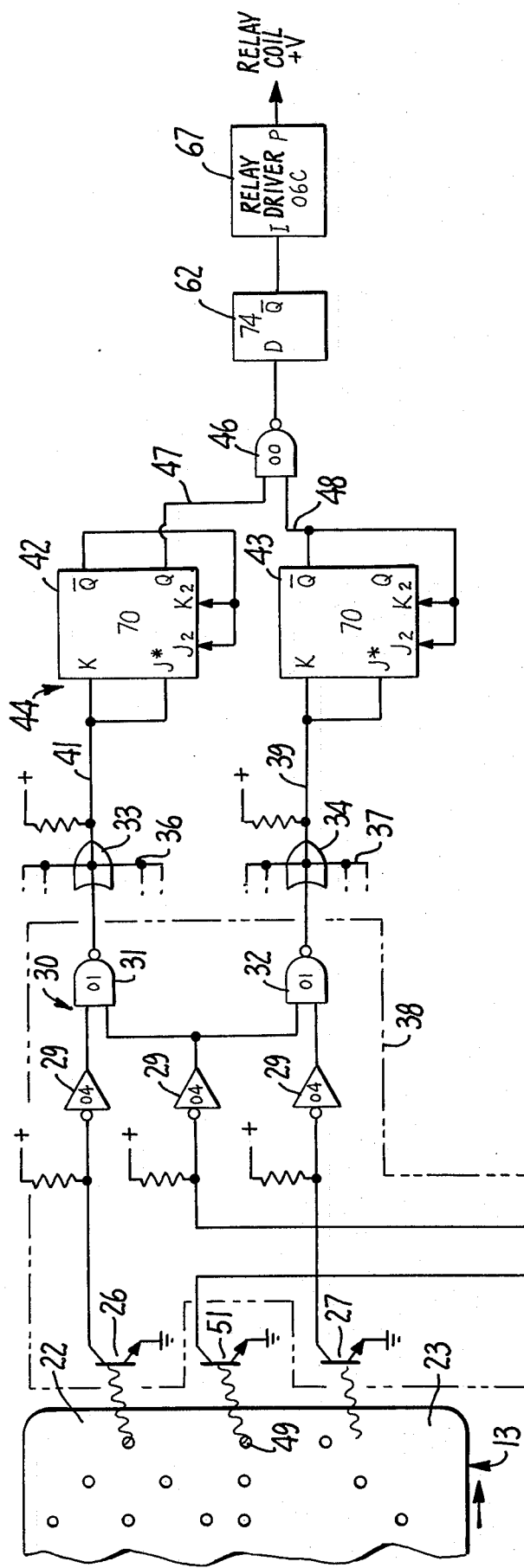
FIG. 3 is a schematic diagram of the logic circuitry of the selector.
Figure 3:
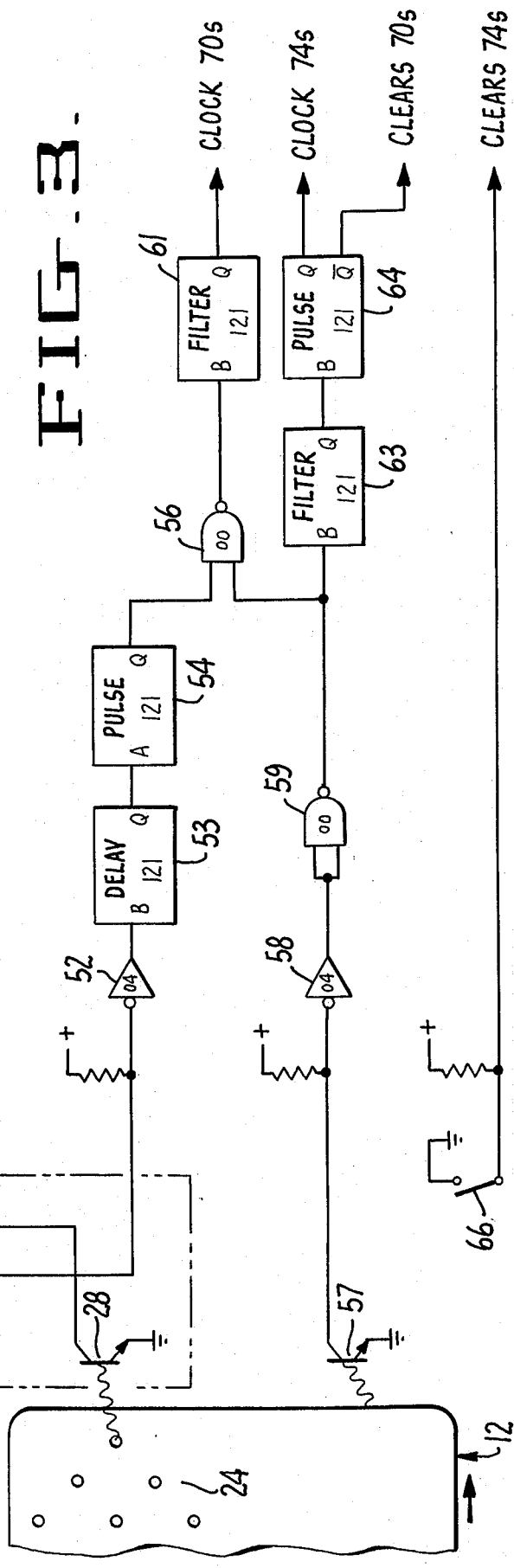

As here shown, the second state is given logical priority over the first, and the first logical priority over the third by the arrangement of the logical comparator circuitry shown in FIG. 3. This arrangement of priorities allows positive exclusion to take precedence over nominal inclusion, which in turn takes precedence over default exclusion. While the appropriate changes in the logic circuitry could be made to alter those relative priorities, the present order has been found to be the most useful for applicant's purposes. Whatever the order of priority, the flexibility of programming is greatly enhanced by the availability of three levels of choice.

The photosensitive devices 19 include first, second and third photosensitive devices, indicated at 26, 27 and 28, respectively in FIG. 3. As shown in this diagram, the photosensitive devices are phototransistors, but it should be appreciated that a number of other devices are also suitable, with the appropriate changes in associated circuitry well understood in the art, such as photodiodes, photoresistive and photovoltaic cells, photo-SCRs, etc. The logical comparator circuit 21 receives the outputs of each of the photosensitive devices 26, 27 and 28, with each output being inverted by an inverter 29.

The phototransistor 26 is positioned so that it observes one of the longitudinal files in the "accept" field 22 on the master medium 13, and the phototransistor 27 is similarly positioned to observe the corresponding file in the "reject" field 23. The phototransistor 28 observes the file of perforations and potentially perforable areas in the "identity" field 24 on the individual medium 12 which corresponds to the "accept" and "reject" files read by the phototransistors 26 and 27. Only one such triplet of phototransistors 26, 27 and 28 is illustrated in FIG. 3, but as many such triplets are provided as these are longitudinal files to be observed in any one of the three fields 22, 23 and 24.

The inverted outputs of the phototransistors 26, 27 and 28 are fed to a first logic circuit 30 which includes NAND units 31 and 32, with the NAND 31 receiving the inverted outputs of phototransistors 26 and 28 and the NAND 32 receiving the inverted outputs of phototransistors 27 and 28. The output of the NAND 31 will therefore be a logical 0 if holes are detected by both phototransistors 26 and 28, and a logical 1 if a hole is detected by one and not the other, or by neither. The logical 0 output of the NAND 31 corresponds to nominal acceptance of the individual medium 12 (so far as that particular datum is concerned), and the logical 1 at this point corresponds to default rejection, so far as the particular datum is concerned.

The output of the NAND 32 will be a logical 0 if holes are detected by both phototransistors 27 and 28, and a logical 1 if a hole is detected by one and not the other, or no holes by either. The logical 0 output of the NAND 32 corresponds to positive rejection of the individual medium 12, despite any nominal acceptance indicated by any other datum. The logical 1 output from the NAND 32 corresponds to the lack of positive rejection by the particular datum concerned, leaving the fate of the individual medium 12 to determination by the accept or default rejection modes, or positive rejection based on other perforations at other locations on the master medium 13.

As noted above, a plurality of triplets of photosensitive devices 26, 27 and 28 may be provided to observe a plurality of longitudinal files of perforations in the "identity" field 24 on the individual medium 12, and the corresponding pairs of files in the accept and reject fields 22 and 23 on the master medium 13. Each of the triplets of phototransistors is connected to a pair of NANDs 31 and 32, and these NANDs are of the open-collector output type, so that the outputs of the NANDs 31 can be connected together to perform a "wire-OR" function, as schematically indicated at 33.

The total output of all the NANDs 31 will thus be a logical 0 if any of the outputs of the individual NANDs 31 is a logical 0, yielding nominal acceptance of the individual medium 12 if acceptance is indicated by a matching of perforations between any one of the files in the "accept" field 22 and the corresponding file of the "identity" field 24 on the individual medium 12. The line 36 from the bottom of the wire-OR symbol 33 indicates a connection to the output of each of the NANDs 31.

Similarly, the outputs of the NANDs 32 are connected together to perform a "wire-OR" function schematically indicated at 34, making their joint output a logical 0 if any of the outputs are a logical 0. In other words, light activation of the second photosensitive device 27 in any of the plurality of triplets or groups 38, with light activation of the third photosensitive device 28 in the same group or triplet, will produce an output signifying positive rejection on line 39. Likewise, the activation of the second photosensitive device 27 in any of the groups or triplets 38, with activation of the first photosensitive device 26 in the same group will produce an output signifying nominal acceptance on line 41 from the wire-OR combination of outputs from all of the NANDs 31.

The priority of the positive rejection determination over nominal acceptance, and of nominal acceptance over default rejection, is governed by a second logic circuit generally indicated at 44, which includes two memory circuits formed by AND-ing type J-K flip-flops 42 and 43, and a NAND logic unit 46. The J* (inverted) and $K_1$ inputs of the flip-flops 42 and 43 receive their signals from the lines 41 and 39, respectively, and the NAND 46 receives as one input the Q output of the flip-flop 42 and as its other input the $\overline{Q}$ output of the flip-flop 43. The $\overline{Q}$ outputs of both flip-flops 42 and 43 are fed back to their respective $J_2$ and $K_2$ inputs to lock the flip-flops in their set state despite changes in the signals on lines 41 and 39.

Since the logical 0 signal on line 41 is the "accept" signal and the logical 0 signal on line 39 is the "positive reject" signals, the memory circuit represented by the J-K flip-flop 42 will set and remain set upon receipt of an "accept" signal, and the memory circuit represented by the J-K flip-flop 43 will set and remain set upon receipt of a "positive reject" signals. As the NAND gate 46 receives the Q output of flip-flop 42 and the $\overline{Q}$ output of the flip-flop 43, it will produce its "accept" output, here a logical 0 signal, only when flip-flop 42 is set (logical 1 output on line 47) and flip-flop 43 is not set (logical 1 output on line 48). The connection of the Q and $\overline{Q}$ outputs of the flip-flops 42 and 43 respectively to the NAND gate 46 thus enforces the priority of the "positive reject" determination over the "nominal accept" determination.

As may be seen from FIG. 2, the master indicia-bearing medium 13 has an additional logitudinal file of perforations 49, with one perforation aligned with and corresponding to each one of the transverse rows of potentially perforable areas in the master medium 13. A fourth photosensitive device 51 is positioned to observe passage of light through the perforations of the file 49, and may be located with the other photosensitive devices in the block generally indicated at 19. The phototransistor 51 generates synchronization pulses in response to the passage of light through the perforations of the file 49, and the pulses (negative for each perforation) are then inverted by an inverter 52.

After inversion by the inverter 52, the synchronization pulses are delayed by a "one-shot" delay unit 53 which acts as a noise filter and allows time for all of the perforations to be centered over their respective photosensitive devices before "reading" takes place. The pulses are received at the B, or Schmitt trigger on positive-going edge, input of the unit 53, and the Q output of the unit 53 is communicated to the A input (negative-going edge) of a "one-shot" unit 54 to provide further noise elimination and pulse shaping. The Q output of the one-shot unit 54 is communicated to one input of a NAND gate 56. The timing of the delay unit 53 is selected in accordance with the speed of the transport means 16, and in the present instance 0.7 millisecond has been found satisfactory. The one-shot 54 delays the signal an additional 0.1 millisecond.

A fifth photosensitive device 57 is positioned to observe an entirely imperforate area of the individual information-bearing medium 12, that is, an area outside the identity field 24, and generate a "card present" signal when light is blocked from the phototransistor 57 by the presence of one of the individual cards or information-bearing media 12. The fifth photosensitive device 57 may also be included within the block 19 at the scanning station 14, adjacent the third photosensitive devices 28. The "card present" signal is inverted by an inverter 58 and inverted again by a NAND gate 59 having its inputs tied together. The output of the NAND gate 59 is communicated to the remaining input of the NAND gate 56, where it serves to gate through the synchronization pulses from the pulse unit 54 so long as one of the individual media is seen by the phototransistor 57.

In the absence of an individual medium 12 at the scanning station 14, the lack of the logical 1 "card present" signal from the NAND gate 59 at one input of the NAND gate 56 will block the synchronization pulses from passing through the NAND gate 56. When both a synchronization pulse and a card present signal are furnished to the NAND gate 56, its output becomes a logical 0, and this signal is communicated to the B input of a one-shot unit 61, which acts as a filter and pulse shaper, with a pulse length of 0.1 millisecond. The Q output of the pulse unit 61, representing the confluence of the synchronization pulses with the card present signal, is communicated to the clock inputs (not shown) of the J-K flip-flops 42 and 43. The clocking of the flip-flops 42 and 43 by the synchronization pulses ensures that the flip-flops are receptive to data only at the point when all perforations and potentially perforable areas are correctly aligned with the phototransistors which read them.

In the form of the invention shown in FIG. 3, a memory circuit, formed by a D-type flip-flop 62, receives the output of the NAND gate 46, to hold that result until the individual medium 12 travels through the machine from the scanning station 14 to another operational station, such as imprinting or segregation. This memory is needed where the scanning station 14 is removed from that operational station, as another medium 12 may be being scanned by the scanning means 14 when the first medium 12 reaches the operational station. The clock signal which gates the output of the NAND gate 46 into the flip-flop 62 is derived from the output of the NAND gate 59, the card present signal.

As a new individual medium 12 moves into the view of the phototransistor 57, the cutoff of light from that phototransistor produces a positive-going signal which is supplied through the inverters 58 and 59 to the B input (Schmitt trigger on positive-going edge) of a filter "one-shot" unit 63, whose output rejects further transitions on its B input for 200 milliseconds to ensure that only a single pulse is produced by the unit 64 for the leading edge of each card. The Q output of the unit 63 is supplied to a one-shot unit 64, which then supplies a 0.01 millisecond pulse to the clock input (not shown) of the flip-flop 62. The decision on the previous individual medium 12 is thus gated into the memory unit 62 just as a new card 12 has begun to be scanned. The $\overline{Q}$ output of the one-shot unit 64 is communicated to the clear inputs (not shown) of the J-K flip-flops 42 and 43, so that their state resulting from the examination of the previous card 12 is cleared as the examination of a new card 12 begins.

The $\overline{Q}$ output of the D-type flip-flop 62 is communicated to a relay driver unit 67, which is turn operates equipment producing the desired physical action by the machine, such as a solenoid governing an imprinting mechanism, as shown in the above-cited application. A momentary normally-open switch 66 is operated by the insertion of a new tray of individual media 12 to produce a negative-going pulse which is communicated to the clear inputs (not shown) of the D-type flip-flops 62 to clear them from the state determined by the last card (or cards) 12 of any previous tray.

One D-type flip-flop 62 is shown here, but it should be appreciated that as many such flip-flops may be provided in series as there are cards 12 moving between the scanning station 14 and the operation station at which the select signal will have physical significance. For example, if one card is at the scanning station 14, one between that station and the operation station, and one card 12 at the operation station, two D-type flip-flop memory units should be provided, one to remember the "accept"/"reject" status of the card 12 lying between the stations, and the other memory unit 62, downstream of the first, to remember the "accept"/ "reject" status of the card 12 at the operation station. All of the D-type flip-flops would be clocked and cleared together by the clock and clear signals for the one D-type flip-flop 62 shown.

Figure 4:
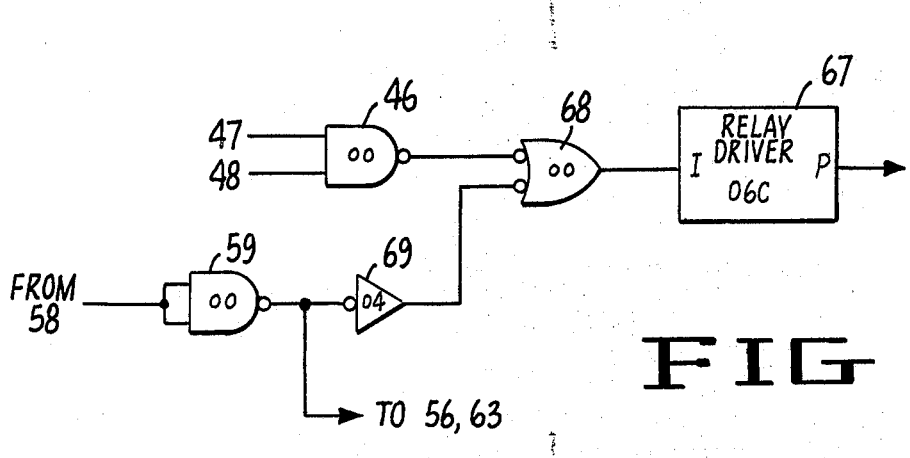
FIG. 4 is a fragmentary schematic diagram of an alternate form of a portion of the logic circuitry.

In applications where no memory unit 62 is needed, as in machines having the operation station immediately adjacent the scanning station 14, or no physical operation on the card 12 is required, as in counting, the alternate output circuit shown in FIG. 4 may be used. In this circuit, a negated-input OR-gate 68 receives the output of the NAND gate 46 and functions itself as a NAND gate, gating a logical 0 level "accept" signal from the NAND gate 46 through when its other input is supplied with a logical 0 level signal from the output of an inverter 69 in response to the logical 1 level card present signal from the output of the NAND gate 59. The "accept"/"reject" determination for the card 12 will thus not be gated through from the NAND gate 46 to the driver unit 67 by the gate 68 until the card 12 leaves the scanning station 14.

As may be seen from FIG. 2, the corresponding files in the accept field 22 and the reject field 23 of the master medium 13 may be arranged to lie symmetrically on either side of the central row of timing perforations 49, in other words, with accept and reject files which correspond lying equidistant from the longitudinal centerline of the master card 13. If the master card 13 is then inverted about the centerline, the accept field 22 will be interchanged with the reject field 23, and the operator of the machine may make a quick and reliable change from acceptance of a particular group of individual media 12 to rejection of that group or vice versa by simply flipping over the master medium 13 and reinserting it into the machine.

The numbers appearing in the center of the logic symbols (except for the relay driver 67) represent the final digits of the standardized part numbers for TTL logic units, and are preceded by a prefix 74 so that a NAND gate 01 becomes 7401. The relay driver 67 belongs to a different series of parts, and its National Semiconductor Co. part number is NH 006C. While the circuit has been shown with positive logic and TTL logic units, it should be appreciated that it likewise be constructed with negative logic, or using diode, DTL, RTL, or MOS-type logic units.

From the foregoing, it may be seen that a tri-level selector device has been provided which allows simplified programming of a specifically excluded class, together with a generally excluded class, and rapid changeover from inclusion to specific exclusion. The selector is capable of complex discrimination among individual cards without requiring either mechanical or electronic complexity. The master and individual media are synchronously scanned for simultaneous comparison, and the master medium which sets selection criteria is readily interchangeable.

What is claimed is:

1. A device for selection among a plurality of individual information-bearing media, comprising
transport means for moving individual information-bearing media through a scanning station,
a master indicia-bearing medium for specifying the characteristics of the individual information-bearing media to be selected,
scanning means adjacent said scanning station and comprising a plurality of sensors, said scanning means being responsive to the characteristics of individual information-bearing media as compared with said master medium to detect those individual information-bearing media appropriate for selection and issue a select signal upon such detection,
said transport means being operative to move one of said individual information-bearing media and said master medium substantially continuously in joint synchronism with each other with respect to said scanning means for simultaneous comparison thereby,
said individual and master media each bearing a pattern of perforate and imperforate areas thereon,
said scanning means comprising a light source, a plurality of photosensitive devices positioned to sense light from said light source passing through said perforate areas, said imperforate areas blocking light from said photosensitive devices, and a three-state logical comparator circuit receiving signals from said photosensitive devices and comparing said signals to select among three identifications of the individual information-bearing medium being scanned, the three identifications being those media to be positively selected, those media to be positively rejected, and those media to be rejected by default.

2. A device for selection as described in claim 1 and wherein said perforate and imperforate areas are formed in a grid of potentially perforable areas on said media, said grid on said master indicia-bearing medium having a pair of said areas thereon corresponding to each single area on said individual information-bearing medium, one of said areas of said pair corresponding to nominally desired selection of said individual medium, the other of said areas of said pair corresponding to positive rejection of said individual medium.

3. A device for selection as described in claim 2 and wherein said areas are arranged in files parallel to the direction of motion of said media and said scanning means comprises first, second and third photosensitive devices and a logical comparator circuit receiving the output of said photosensitive devices, said third photosensitive device being positioned to observe one file of areas on said individual medium and said first and second photosensitive devices being positioned to observe a corresponding pair of files on said master medium, said comparator circuit producing a first output upon light activation of said first and third photosensitive devices in the absence of activation of said second photosensitive device, and a second output upon light activation of said second and third photosensitive devices, upon activation of said third photosensitive device without activation of said first photosensitive device, and upon activation of said first photosensitive device without activation of said third photosensitive device.

4. A device for selection as described in claim 3 and wherein said logical comparator circuit comprises a first logic circuit connected to said photosensitive devices and operative to produce an accept signal upon light activation of said first and third photosensitive devices and a reject signal upon activation of said second and third photosensitive devices, and a second logic circuit connected to said first logic circuit and operative to receive said accept and reject signals and produce said first output under two jointly necessary conditions, the presence of said accept signal and the absence of said reject signal, and produce said second output under two independently sufficient conditions, the absence of said accept signal, and the presence of said reject signal.

5. A device for selection as described in claim 3 and wherein said files on said master medium are grouped in two areas disposed symmetrically about the longitudinal centerline of said master medium, the members of corresonding pairs of said files being equidistantly spaced from said longitudinal cneterline, whereby the functions of the files in said two areas may be interchanged by inversion of said master medium about said longitudinal centerline.

6. A device for selection as described in claim 5 and wherein said master indicia-bearing medium bears an additional longitudinal file of perforations thereon, with one perforation for each transverse row of potentially perforable areas on said master medium, said additional file being disposed along said longitudinal centerline, said logical comparator circuit further comprising a fourth photosensitive device positioned to observe passage of light through the perforations of said additional file and operative to generate synchronization pulses in response to such passage of light, said logical comparator circuit being clocked in part by said synchronization pulses.

7. A device for selection as described in claim 3 and wherein said scanning means further comprises a plurality of groups of said first, second and third photosensitive devices, each connected to said logical comparator circuit, said logical comparator circuit producing said first output upon light activation of corresponding first and third photosensitive devices in any of said groups in the absence of activation of said second photosensitive device in the same group, and producing said second output upon activation of corresponding second and third photosensitive devices in any of said groups, upon activation of said third photosensitive device without activation of the corresponding first photosensitive device in all of said groups, and upon activation of said first photosensitive device without activation of the corresponding third photosensitive device in all of said groups.

8. A device for selection as described in claim 5 and wherein said logical comparator circuit comprises a plurality of first logic circuits, one connected to each of said groups, each of said first logic circuits being operative to produce an accept signal upon light activation of said first and third photosensitive devices and a reject signal upon light activation of said second and third photosensitive devices, and a second logic circuit connected to each of said first logic circuits and operative to receive said accept and reject signals and produce said first output upon concurrence of two jointly necessary conditions, the presence of at least one accept signal and the absence of any reject signals, and to produce said second output upon occurrence of either of two independently sufficient conditions, the absence of any accept signals, and the presence of any reject signals.

9. A device for selection as described in claim 6 and wherein said first logic circuit comprises first and second logical NAND circuits, said first NAND having one of its inputs connected to the output of said first photosensitive device and another of its inputs connected to the output of said third photosensitive device, and said second NAND having one of its inputs connected to the output of said second photosensitive device and another of its inputs connected to the output of said third photosensitive device, the output of said first NAND being said accept signal and the output of said second NAND being said reject signal.

10. A device for selection as described in claim 7 and wherein the outputs of said first NANDs are connected together in wire-OR fashion to produce a joint accept signal when any of said first NAND outputs yields an accept signal, and the outputs of said second NANDs are connected together in wire-OR fashion to produce a joint reject signal when any of said second NAND outputs yields a reject signal.

11. A device for selection as described in claim 8 and wherein said logic circuit further comprises a first memory circuit connected to the wire-OR output of said first NANDs and operative to set upon receipt of said accept signal and remain set despite cessation of said accept signal before reading of said individual medium is completed, and a second memory circuit connected to the wire-OR output of said second NANDs and operative to set upon receipt of said reject signal and remain set despite cessation of said reject signal before reading of said individual medium is completed.

12. A device for selection as described in claim 11 and wherein said second logic circuit further comprises a third logical NAND circuit connected to the outputs of said first and second memory circuits and operative to yield as its output a select signal at the completion of reading of the individual medium enabling the selection of said individual medium only when said first memory circuit is set and said second memory circuit is not set.

13. A device for selection as described in claim 10 and wherein said second logic circuit further comprises a D-type flip-flop having its input connected to the output of said third logical NAND circuit, and said logical comparator circuit further comprises a fifth photosensitive device positioned to observe an imperforate area of said individual information-bearing medium and generate a card present signal when light is blocked from said fifth photosensitive device by presence of an individual information-bearing medium, said D-type flip-flop being clocked by a signal derived from the absence of said card present signal, whereby said D-type flip-flop serves to gate the select signal through to further devices if the select signal is present at the completion of the passage of the individual information-bearing medium by the scanning means.

14. A device for selection as described in claim 10 and wherein said second logic circuit further comprises a fourth NAND gate having one input thereof connected to the output of said third logical NAND circuit, said logical comparator circuit further comprising a fifth photosensitive device positioned to observe an imperforate area of said individual information-bearing medium and generate a card-present signal when light is blocked from said fifth photosensitive device by the presence of an individual information-bearing medium at said scanning station, another input of said fourth NAND gate being supplied with a signal derived from said card-present signal and having a logical polarity opposite that of the select signal output of said third NAND when an individual medium is present at said scanning station and a logical polarity the same as said select signal output of said third NAND when no individual medium is present at the scanning station, whereby said fourth NAND will serve to gate said select signal from the output of said third NAND through to further signal-processing stages at the end of the scanning of said individual medium.

15. A device for selection as described in claim 10 and wherein said first memory circuit comprises a first J-K flip-flop of the AND-ing type with the joint accept signal from the wire-OR output of said first NANDs connected to its K input and its J* input, the Q output of said first J-K flip-flop being fed to said third logical NAND circuit and the Q output being fed back to the $J_2$ and $K_2$ inputs of said first J-K flip-flop to lock said flip-flop upon receipt of an accept signal, and said second memory circuit comprises a second J-K flip-flop of the AND-ing type with the joint reject signal from the wired-OR output of said second NANDs connected to its K input and its J* input, the Q output of said second J-K flip-flop being fed to said third logical NAND circuit and fed back to the $J_2$ and $K_2$ inputs of said second J-K flip-flop to lock said second J-K flip-flop upon receipt of a reject signal.

16. A device for selection as described in claim 11 and wherein said master indicia-bearing medium has an additional longitudinal file of perforations thereon, with one perforation for each transverse row of potentially perforable areas in said master medium, said logical comparator circuit further comprising a fourth photosensitive device positioned to observe passage of light through said additional file and operative to generate synchronization pulses in response to such passage of light, said first and second J-K flip-flops being clocked by said synchronization pulses.

17. A tri-level logical comparator for synchronous comparison of individual information-bearing media with a master medium while both media are in motion relative to a scanning station, to select individual media for further operation thereon, comprising
  scanning means adjacent the scanning station operative to scan data encoded on the individual and master media, said scanning means comprising
    detection means positioned to sense data encoded on the individual media and the master medium and generate signals in response thereto, and
  a logic circuit coupled to said detection means to receive said signals therefrom and compare the signals from the master medium with the signals from individual media, said logic circuit having a first state of response to comparison of said media calling for selection of that individual medium, a second state in which said comparison calls for positive rejection of the individual medium compared, said second state having priority over said first state, and a third state in which said comparison calls for rejection of the individual medium compared, said first state having priority over said third state in determining the outcome of the logical comparison of said individual media with said master medium.

18. A logical comparator as described in claim 17 and wherein said master medium and said individual media both bear a pattern of perforate and imperforate areas thereon arrayed in longitudinal files parallel to the direction of motion of said media relative to the scanning station, said detection means comprising a light source and a plurality of photosensitive devices positioned to sense light from said light source passing through said perforate areas, said imperforate areas blocking light from said photosensitive devices, said pattern on said master medium having a pair of said files thereon corresponding to each file on said individual medium, one of said files of said pair corresponding to nominal selection of an individual medium having a perforation at the corresponding location in the corresponding file, the other of said files of said pair corresponding to positive rejection of an individual medium having a perforation at the corresponding location in the corresponding file.

19. A logical comparator as described in claim 18 and wherein said detection means further comprises a plurality of first, second and third photosensitive devices, each of said third photosensitive devices being positioned to observe one of a plurality of said files on said individual medium and each of said first and second photosensitive devices being positioned to observe the corresponding pair of said files on said master medium, said logic circuit comprising
  a plurality of first and second NAND gates, each first NAND gate having one of its inputs connected to one of said first photosensitive devices and another of its inputs connected to the corresponding one of said third photosensitive devices, each of said second NAND gates having one of its inputs connected to one of said second photosensitive devices and another of its inputs connected to the corresponding one of said third photosensitive devices,
  a first OR-function circuit receiving the outputs of all of said first NAND gates,
  a second OR-function circuit receiving the outputs of all of said second NAND gates,
  a first self-locking memory circuit receiving the output of said first OR-function circuit, a second self-locking memory circuit receiving the output of said second OR-function circuit, and a third NAND gate having one of its inputs connected to the direct output of said first memory circuit and another of its inputs connected to the inverted output of said second memory circuit, whereby said first NANDs will produce a first signal corresponding to said first state of response upon light activation of any corresponding first and third photosensitive devices, and said second NANDs will produce a second signal corresponding to said second state of response upon light activation of any corresponding second and third photosensitive devices, the outputs of said first and second OR-function circuits being governed by the presence of any of said first and second signals, respectively, the output of said third NAND gate being a signal for selection when at least one of said first signals is present and none of said second signals are present and a signal for rejection when any of said second signals are present and when both said first and second signals are absent, the absence of both said first and second signals being said third state of response.

20. A logical comparator as described in claim 19 and wherein each member of said pair of said files on said master medium is located equidistant from the longitudinal centerline of said master medium so that corresponding files are symmetric with respect to that centerline, whereby the files signifying nominal acceptance may be interchanged with those signifying positive rejection by inversion of said master medium about said longitudinal centerline.

21. A logical comparator as described in claim 19 and wherein said first and second NANDs are of the open-collector output type, the outputs of said first NANDs being combined in wire-OR fashion to form said first OR-function circuit and the outputs of said second NANDs being combined in wire-OR fashion to form said second OR-function circuit, said first and second memory circuits comprising J-K flip-flops of the AND-ing type receiving the outputs of said first and second OR-function circuits on one input of each flip-flop, respectively, the inverted output of each flip-flop being fed back to another input of the same flip-flop to lock same, said detection means further comprising a fourth photosensitive device positioned to observe an additional longitudinal and entirely perforate file on said master medium, and a fifth photosensitive device positioned to observe an entirely imperforate area on said individual medium, said logic circuit further comprising a gating device receiving the output of said third NAND gate and being clocked by a signal derived from said fifth photosensitive device, said J-K flip-flops being clocked by a signal derived from said fourth photosensitive device.

22. A logical comparator as described in claim 20 and wherein said additional longitudinal and entirely perforate file on said master medium is disposed along the longitudinal centerline of said master medium.

23. A logical comparator as described in claim 20 and wherein said gating device comprises a D-type flip-flop clocked by a signal derived from said fifth photosensitive device.

24. A logical comparator as described in claim 21 and wherein said gating device comprises an additional NAND gate receiving the output of said third NAND gate on one input and a signal derived from said fifth photosensitive device on another input.

* * * * *